Aug. 9, 1960    A. J. RUSCITO ET AL    2,948,770
MOUNTING FOR COMBINED CAPACITOR ARRANGEMENTS
Filed Aug. 29, 1957
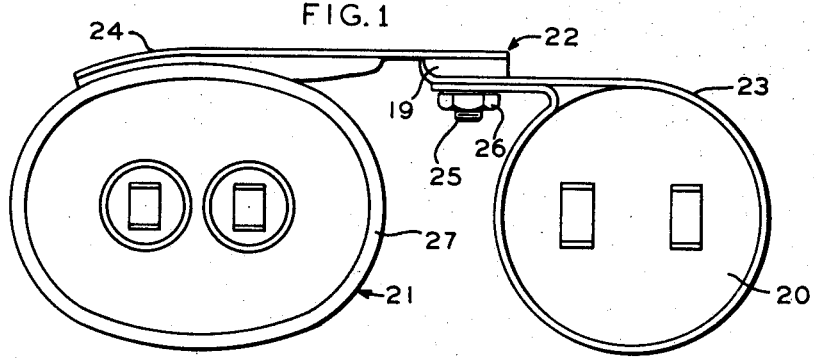
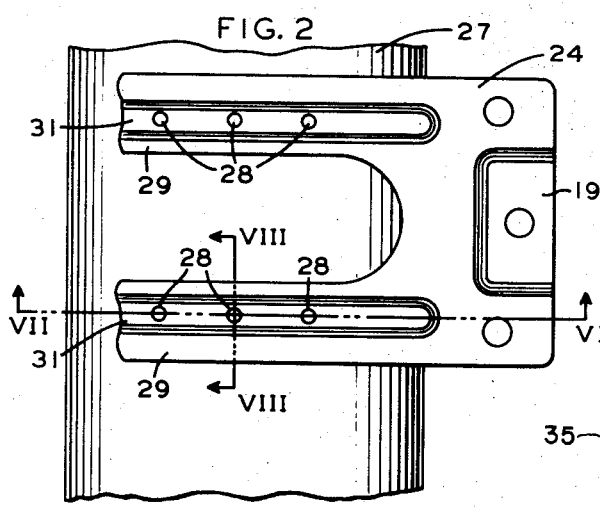
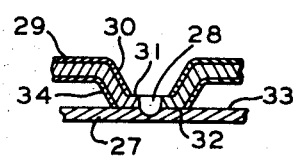
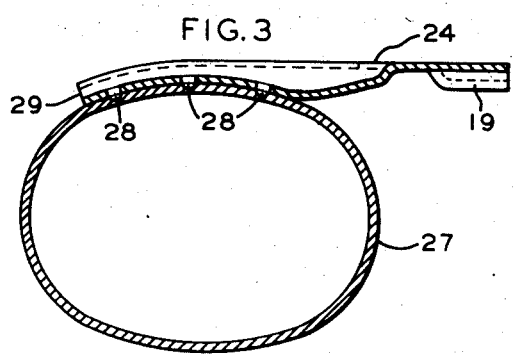
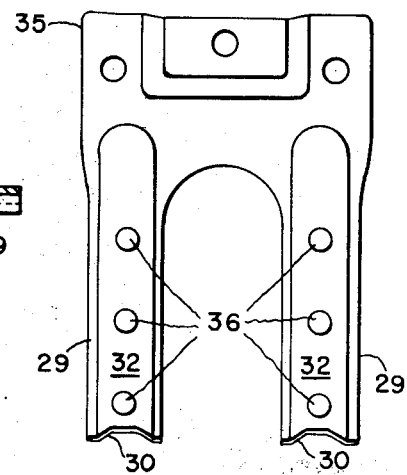
INVENTORS
ANTHONY J. RUSCITO
HAROLD V. MAY
BY Connolly and Hutz
THEIR ATTORNEYS

United States Patent Office 2,948,770
Patented Aug. 9, 1960

2,948,770

MOUNTING FOR COMBINED CAPACITOR ARRANGEMENTS

Anthony J. Ruscito, Williamstown, and Harold V. May, Pittsfield, Mass., assignors to Sprague Electric Company, North Adams, Mass., a corporation of Massachusetts Filed Aug. 29, 1957, Ser. No. 681,016

2 Claims. (Cl. 174—52)

This invention relates to means for mounting two or more capacitors having related functions in a juxtaposed arrangement and more particularly to the mounting of motor-start and motor-run capacitors in air conditioning equipment.

Air conditioning apparatus includes motor capacitors. These capacitors mounted within the air conditioning apparatus are subjected to various conditions during use which may limit their performance and their life. These capacitors are the motor-start capacitor and the motor-run capacitor. The motor-start capacitor is employed for mainly no more than a short moment in the operation of the apparatus. The motor-run capacitor, on the other hand, though not subjected to so high a load as the motor-start capacitor, is operated for long periods of time. The conditions of operations of the two capacitors is thus different and the demands placed upon the capacitors both in performance and in longevity are different. In addition, both types of capacitors are hampered or injured by moisture and corrosive conditions. Moisture can cause electrical leakage as well as deterioration through oxidation. The effectiveness and life of capacitors is also influenced by the security of the mounting thereof.

It is a valuable feature to provide a capacitor arrangement in which the components employed can be adapted to provide the necessary capacitance characteristics for a variety of circuits. Interchangeability of components in a single arrangement of capacitors can provide this adaptability of capacitor characteristics to circuitry requirements. An additional consideration in capacitor arrangement is their combination with the switching relay.

It is an object of this invention to provide a capacitor assembly in which the capacitors are conveniently and securely mounted for effective operation and long life.

It is another object of this invention to provide a capacitor assembly for air conditioning units having motor-start and motor-run capacitors assembled to provide interchangeability.

A further object of this invention is the provision of an arrangement of motor capacitors for air conditioning equipment allowing for heat dissipation from the capacitors and minimizing corrosive conditions around the capacitors.

Still another object of this invention will become more apparent upon consideration of the following description taken together with the accompanying drawings in which:

Fig. 1 is an end elevational view of another form of capacitor arrangement of this invention;

Fig. 2 is a top plan view of a section of the capacitor assembly of Fig. 1 showing part of one capacitor and the bracket for mounting;

Fig. 3 is a sectional view of part of the capacitor assembly shown in Fig. 2 taken on line III—III of Fig. 3 in the direction of the arrows;

Fig. 4 is a sectional view of a portion of the bracket for mounting taken on line IV—IV of Fig. 3 in the direction of the arrows; and Fig. 5 is a bottom view of the bracket of this invention in a modified form.

This invention provides motor-run and motor-start capacitor mountings for assembly in an air conditioning apparatus by means of which the capacitors are securely and effectively mounted in an efficient relationship and protected against deterioration through use.

As shown in Figs. 1 through 4 a simple means of mounting the capacitors is adapted to use in air conditioning apparatus. In Fig. 1 a capacitor assembly for a small home air conditioning apparatus is shown made up of motor-start capacitor 20 and a motor-run capacitor 21 held in the assembly by a bracket means 22. The bracket means 22 is made up of a loop strap 23 and a ribbed fork bracket 24. The strap 23 girdles the motor-start capacitor 20 and is clamped on a threaded post 25 by a nut 26. The fork bracket 24 is welded to a can 27 which contains the motor-run capacitor 21. A dished portion 19 of bracket 24 is provided to house post 25 and to position motor start capacitor 20 in stand-off relationship to the supporting surface to which bracket 24 may be secured. Thus bracket means 22 provides a compact unitary mounting for both the motor-start and motor-run capacitors necessary in home air-conditioning apparatus.

As shown in Fig. 2 the can 27 is welded to the bracket 24 at three spots 28 on each of the legs 29 of the bracket 24. The legs 29 of the bracket 24 are curved to conform to the circumferential outline of the can 27, as shown in Fig. 3. The welded spots 28 between the leg and the can 27 are described along this curvilinear abutment between the leg 29 and the can 27.

Each of the legs 29 is channel shaped to form a rib. The enlarged section of Fig. 4 shows one of the legs 29 in abutment with the can 27. The leg 29 is made up of a U-channel 30 which has a central portion 31 in abutment on its bottom surface 32 with the outer surface 33 of the can 27. As shown in Fig. 4 the welds at the spots 28 join the surface 32 and 33 together. Outside of the areas of the spots 28 the surfaces 32 and 33 abut in varying degrees of close contiguity but are not integral or secured together.

In the manufacture of the capacitor assembly of Figs. 1 through 5 the can 27 is attached to the bracket 24 with the surface 27 bare of protective coating other than the thin coating of the structural metal. After the mounting of the bracket 24 on the can 27 the assembly is subjected to a suitable coating such as painting by spray painting or some other means of application. The paint coat deposits on the can surface to provide a protective layer. The close contiguity of surfaces 32 and 33 prevent the protective layer from penetrating into the area of abutment between the legs 29 and the surface 33 of the can 27. Surface tension among other phenomena prevent the paint from seeping between the bracket 24 and the can 27.

In one feature of this invention the bracket 24 is provided with a cadmium coat 34 before its inclusion in the manufacture of the capacitor assembly. It has been discovered that the capacitor assembly of the embodiment of Figs. 1 through 4 provides a protective coating to the area of the surface 33 lying under the surface 32 of the channel 30. This protective surface is provided by a plating action during the operation of the capacitor 21 in use. The cadmium coat 34 on the bracket 24 is ionized during the use of the capacitor 21 and cadmium ions are formed. The cadmium ions migrate across the intervening space from the bracket to the can 27 and plate out as cadmium metal on the surface 33 of the can 27.

The bracket is preferably formed so as to localize the points of welding and thus concentrate the welding at the point where it is wanted. The bracket also should be made as much of a cradle as possible providing the longitudinal legs 29 with the maximum curvature permitted by conformation with the circumference of the can which it supports. It is also desirable to position the end weld on each leg 29 as close to the end of the leg 29 as possible. A modified bracket 35 is shown in the bottom view of Fig. 5. This bracket 35 is formed in the same general shape as bracket 24 having a pair of legs which are formed with channels 30. In the bracket 35 the under surface 32 of each leg 29 is provided with a row of knobs 36 which are aligned along the length of the respective legs 29 and raised slightly up on the respective surfaces 32. These knobs 36 contact the can and provide at the respective spots of welding areas where the welding can be concentrated. Thus, in welding the bracket 35 to the can 27 the spots corresponding to weld spots 28 as shown in Figs. 2, 3 and 4 are concentrated at the contact of the knobs 36 with the can surface 33. Thus, if the bracket 35 is substituted for the bracket 24 of Figs. 2, 3 and 4 the welding may be positioned more accurately at the points where it is wanted. It is to be noted that the end knob 36 on each leg 29 is positioned as closely as possible to the end of the respective leg 29.

In the plate portion of the brackets 24 and 35 there is provided a raised butt end 37. This raised butt end permits the attachment of another capacitor and the mounting means for another capacitor to the respective brackets 24 and 35. By providing the structure of the raised butt end 37 the other capacitor may be attached to the respective bracket 24 or 35 yet the bracket retains a flat upper surface.

Thus the mounting arrangement of Figs. 1 through 5 not only provides a simple means of combining a motor-start and a motor-run capacitor but also provides a structure which is simple of manufacture and protects an area of the capacitor can which otherwise is subject to corrosion. The bracket is formed with a minimum cross section and a maximum strength. To make it as narrow as possible it is channeled which in turn provides as narrow a web as possible. This narrow web reduces trapping of the oil and permits spray painting to reach into the surface between the bracket and the can. As pointed out above, sacrificial deposition from the plating on the bracket to the can aids in the protection of the can. The welds are localized in the modified form. The welds ground the can to the bracket. The can is completely coated to pass outdoor requirements and the marring of the protective plate coat by a pressure gripping bracket is avoided in the new bracket of this invention. This bracket also provides an intimate contact with the can to enhance heat dissipation. The bracket is also advantageous in providing a cradle formed by the longitudinal curvature of the legs nesting against the supported can.

Further advantages of the combination of this invention include the longer life afforded to the components contained in the arrangement. For example, air conditioning equipment may be designed to operate under load so that the units run all the time. Capacitors mounted in accordance with this invention have the ability to withstand such use. Another advantage is found in the channel shaped bracket of the form shown in Figs. 1 through 5. This bracket is structurally strong but provides a minimum contact area for the spot welding of the bracket to the can. This provides the necessary connection between the bracket and the can but allows a maximum area for the application of a paint coat.

It will be understood that the embodiments of this invention are set forth in the description for the purpose of illustration. It is intended that the invention be limited only by the scope of the appended claims.

What is claimed is:

1. A bracket for supporting an electrically charged metal container having in combination a flat plate, a cut-out portion of said plate, a pair of parallel-extending legs formed in said plate by said cut-out portion, an oval metal container, said legs being curved to conform to the exterior surface of said container, a U-shaped channel in each of said legs, a narrow strip of surface formed on each channel and running longitudinally of the channel in contact with said container surface, a series of small area depressions in said strip welding the channel to said container-surface and the end of said bracket remote from said legs being provided with a dish-shaped means for receiving a complementary bracket member.

2. The combination as claimed in claim 1 including a strap, and an electrical component supported in said strap, the ends of said strap being secured in combination with said dish-shaped means.

References Cited in the file of this patent
UNITED STATES PATENTS

| | | |
|---|---|---|
| 566,544 | Smith | Aug. 25, 1896 |
| 1,358,322 | McIntosh | Nov. 9, 1920 |
| 1,656,426 | Cunningham | Jan. 17, 1928 |
| 1,900,161 | Cohan | Mar. 7, 1933 |
| 2,081,047 | Basch | May 18, 1937 |
| 2,304,976 | Watter | Dec. 15, 1942 |
| 2,412,175 | Ridgway | Dec. 3, 1946 |
| 2,441,734 | Van Hyning | May 18, 1948 |
| 2,495,189 | Stein et al. | Jan. 17, 1950 |
| 2,537,463 | Hocher et al. | Jan. 9, 1951 |
| 2,747,827 | Georgiev | May 29, 1956 |